(12) United States Patent
Amato

(10) Patent No.: US 6,255,936 B1
(45) Date of Patent: Jul. 3, 2001

(54) BEEPER SECURITY SYSTEM

(76) Inventor: Joe Amato, 1330 Park Ave., Apt. 5-G, New York, NY (US) 10029

( * ) Notice: Subject to any disclaimer, the term of this patent is extended or adjusted under 35 U.S.C. 154(b) by 0 days.

(21) Appl. No.: 09/542,992

(22) Filed: Apr. 4, 2000

Related U.S. Application Data

(60) Provisional application No. 60/128,055, filed on Apr. 7, 1999.

(51) Int. Cl.[7] ........................................ H04Q 1/30
(52) U.S. Cl. ........................................ 340/311.1; 340/426
(58) Field of Search .................... 340/426, 311.1

(56) References Cited

U.S. PATENT DOCUMENTS

| | | |
|---|---|---|
| 4,929,927 | 5/1990 | Uhlin . |
| 5,229,744 | 7/1993 | Ogura . |
| 5,486,814 | 1/1996 | Quinones . |
| 5,488,351 | 1/1996 | Hedayatnia et al. . |
| 5,793,283 | 8/1998 | Davis . |
| 6,028,506 * | 2/2000 | Xiao ........................... 340/438 |

FOREIGN PATENT DOCUMENTS 2278703   7/1994  (GB) .

OTHER PUBLICATIONS

Firstech, Inc., *compuSTAR*; no date.

\* cited by examiner

*Primary Examiner*—Edward Lefkowitz
(74) *Attorney, Agent, or Firm*—Richard C. Litman

(57) ABSTRACT

A security alarm system comprises a personal pager device which is electronically linked with the user's residence and motor vehicle. An electronic signal is immediately transmitted to the pager upon unauthorized intrusion of the residence and/or motor vehicle. The electronic signal is converted at the pager to produce either a tactile, audible, and/or visual signal. No audible alarm occurs at the site of the intrusion.

5 Claims, 3 Drawing Sheets

BEEPER SECURITY SYSTEM

CROSS-REFERENCE TO RELATED APPLICATION

This application claims the benefit of U.S. Provisional Patent Application Ser. No. 60/128,055, filed Apr. 7, 1999.

BACKGROUND OF THE INVENTION

1. Field of the Invention

The present invention generally relates to security alarm systems. More specifically, the present invention is drawn to a system that immediately alerts a user when the user's motor vehicle or home security system is breached.

2. Description of Related Art

The use of security alarm systems for motor vehicles and homes is well known in the prior art. Most of the prior art systems are designed to emit a loud audible alarm upon intrusion of the vehicle or home. Unfortunately, the aforementioned systems have proven to be somewhat unreliable in that the loud alarm sometimes sounds even though no intrusion has occurred. The result of this scenario is that the alarms are frequently ignored by the public and are often viewed with annoyance. An alarm system designed to alert only the owner of the vehicle or home would be a welcome addition to the art.

U.S. Pat. No. 4,929,927 (Uhlin) discloses a surveillance installation to protect the perimeter of a particular area.

U.S. Pat. No. 5,486,814 (Quinones) and British Patent number 2,278,703 A show wrist attached devices for sending or receiving a monitoring signal.

U.S. Pat. No. 5,793,283 (Davis) relates to a pager theft prevention system for use with a motor vehicle. The system provides a method of tracing the vehicle by continuously transmitting a pager signal.

U.S. Pat. No. 5,229,744 (Ogura) and U.S. Pat. No. 5,488,351 (Hedayatnia et al.) disclose vibrator mechanisms for personal paging devices.

The Firstech, INC. brochure shows a vehicle security system having a visual readout.

None of the above inventions or patents, taken either singly or in combination, is seen to disclose a pager security alarm system for receiving signals from a home and motor vehicle as will subsequently be described and claimed in the instant invention.

SUMMARY OF THE INVENTION

The improved security alarm system of the instant invention provides for a personal pager device. In addition to conventional pager circuitry, the pager device of the instant invention also includes circuitry which links the pager to security systems of a motor vehicle and a residence.

To accomplish this, the vehicle and residence are each provided with an electronic control mechanism in the form of a microprocessor or the like. A number of sensors are positioned to monitor strategic areas of the motor vehicle and residence. Each sensor is designed to generate a signal to its respective control mechanism (residence or vehicle) when security of the particular sensor's area is breached without authorization. In turn, the electronic control mechanism transmits a designated electronic alarm signal via free space. An electronic receiver, in the form of a pager, is adapted to receive the alarm signal. The pager will transform the received electronic alarm signal to produce either a tactile, audible, and/or visual signal to alert the user. The produced tactile and audible signals will be distinct so that the user can differentiate between an alarm signal and a conventional paging signal. The pager is provided with an electronically operated readout screen which indicates which particular sensor area has been breached i.e. autohood.

The system of the instant invention will produce no loud vehicle or home alarms. The user, however, will know instantly and specifically when unauthorized intrusion has occurred.

Accordingly, it is a principal object of the invention to provide an improved security alarm system for a home and motor vehicle.

It is another object of the invention to provide an improved security alarm system that generates no loud and obtrusive audible signals.

It is a further object of the invention to provide a security alarm system which is incorporated in a personal pager.

Still another object of the invention is to provide a security alarm system which will instantly alert a user when a breach of security occurs.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
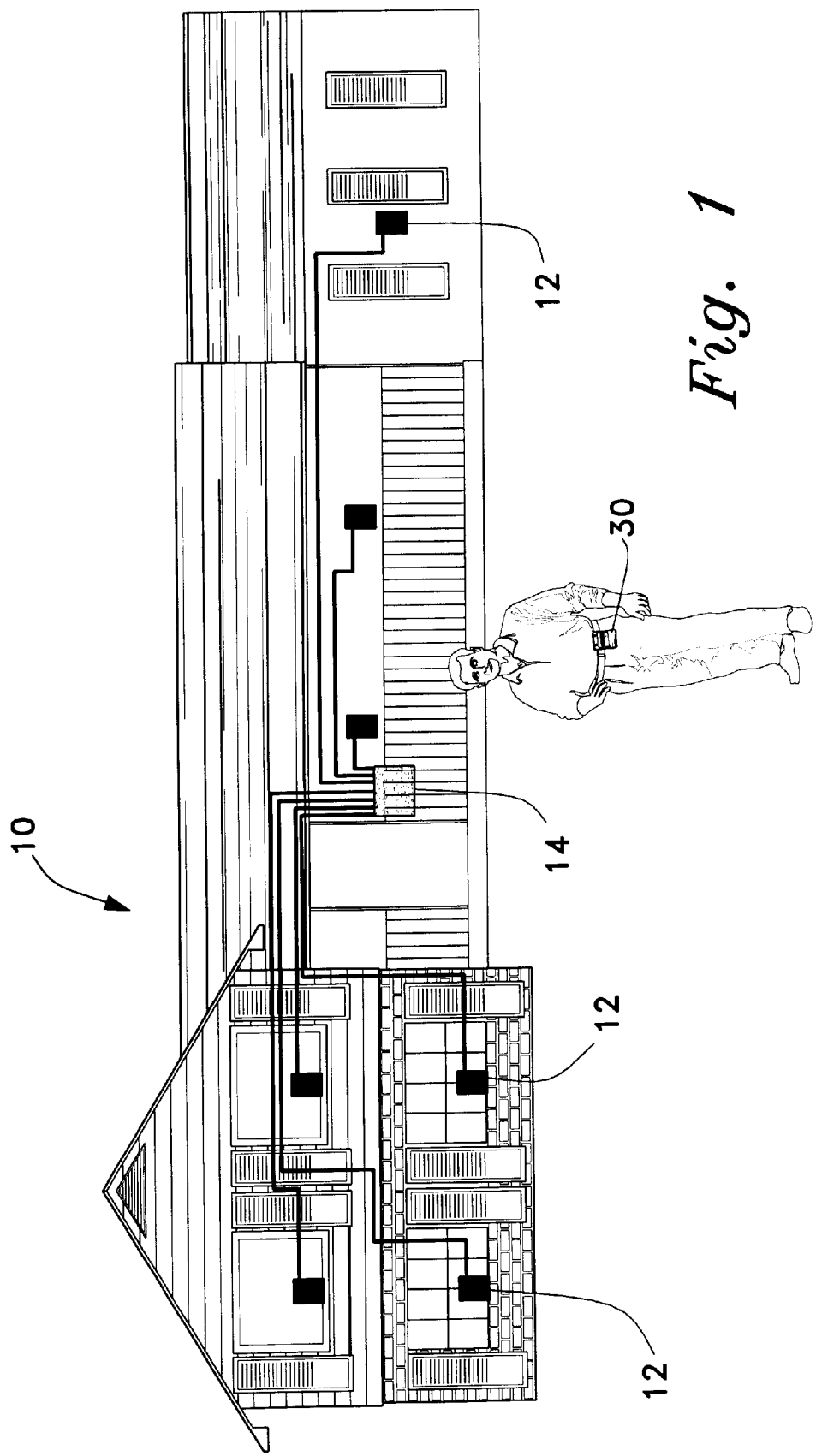
FIG. 1 is an environmental view of a pager security system according to the present invention when utilized with a residence.

FIG. 1 of the drawings illustrates a residence generally indicated at 10. Residence 10 is provided with sensors 12 positioned to monitor areas (doors, windows, etc.) that are potential targets for unauthorized intrusion. The sensors 12 feed into an electronic control mechanism 14 (microprocessor or the like). If unauthorized entry occurs in a particular area, the sensor monitoring that area will generate a signal to electronic control mechanism 14. Upon receiving the sensor generated signal, electronic control mechanism 14 will transmit a designated electronic alarm signal, via free space, to a device adapted to receive the alarm signal. Sensors 12 and electronic control mechanism 14 utilize electronic circuitry (not shown) which is conventional and well known in the art. Unlike prior art alarm systems, the system of the present invention produces no audible alarm at the residence.

Figure 2:
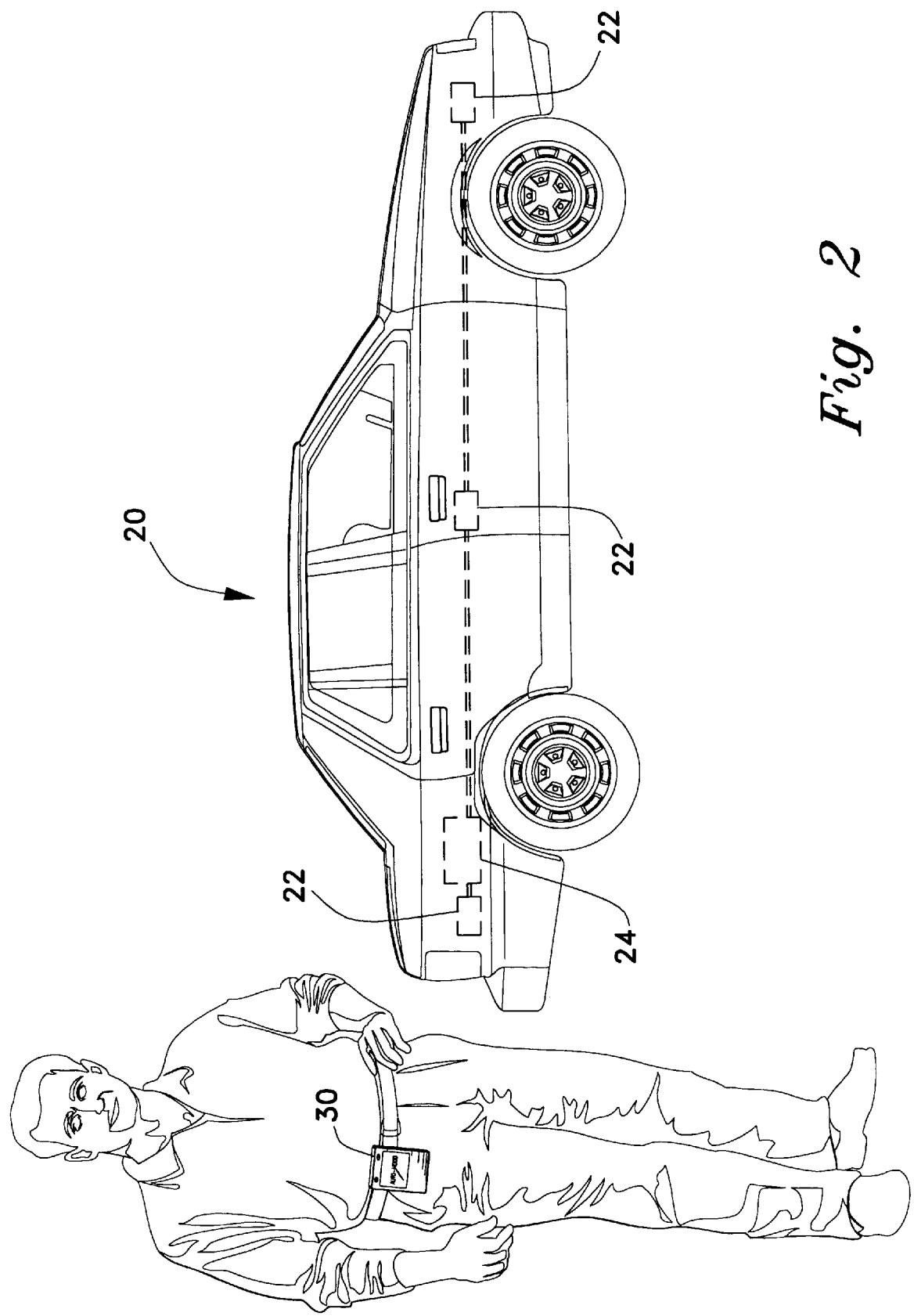
FIG. 2 is an environmental view of a pager security system according to the present invention when utilized with a motor vehicle.

Attention is now directed to FIG. 2 in which a motor vehicle is indicated generally at 20. Motor vehicle 20 is provided with sensors 22 positioned to monitor areas (doors, trunk, hood, etc.) of the motor vehicle which may be targets for unauthorized intrusion. Sensors 22 feed into an electronic control mechanism 24. Sensors 22 and electronic control mechanism 24 function in the same manner as sensors 12 and electronic control mechanism 14 when there is an unauthorized intrusion, in that mechanism 24 will transmit a designated electronic alarm signal, via free space, to a device adapted to receive the alarm signal. As at the residence, the system of the present invention produces no audible alarm at the motor vehicle when there is unauthorized intrusion.

Figure 3:
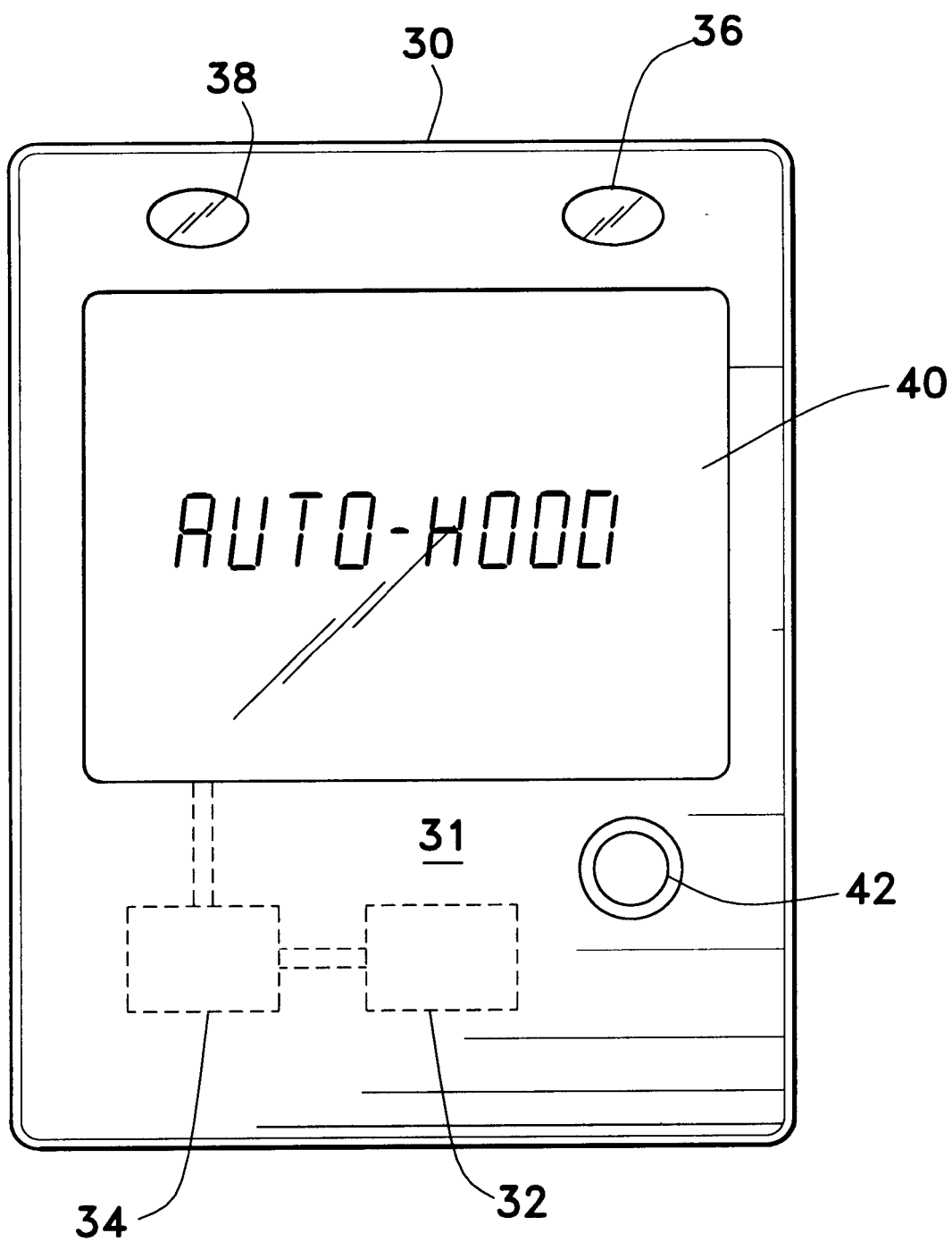
FIG. 3 is a plan view of a pager according to the present invention.

A single device in the form of a personal pager 30 is designed to receive any alarm signal transmitted from mechanisms 14 and/or 24. As best seen in FIG. 3, pager 30 employs electronic signal receiver 32 for receiving the transmitted alarm signal. The received signal is transformed through a specialized controller 34 to produce a pager alarm, which alarm may be of tactile, visual or audible form. In its tactile (vibration) and audible (beeps) form, the pager alarm will be significantly different than the conventional pager signal so that the user is immediately aware that the situation demands attention.

Light sources 36 and 38 are employed as visual indicators. Green light 36 indicates an all clear condition. Red light 38 indicates that intrusion has occurred. Controller 34 also functions to create an LED readout 40 which identifies the sensor(s) generating the alarm. In addition to conventional pager control switches, an authorization switch 42 is included for deploying an authorization signal to the residence and/or motor vehicle whereby the alarm system is disarmed. Pager 30 is encased in housing 31 and may be carried in a purse or hung from a belt as desired. Controller 34 may also be employed as a timer which will emit a signal at the end of a set period. This feature is especially useful when parked at a parking meter.

It is to be understood that the present invention is not limited to the sole embodiment described above, but encompasses any and all embodiments within the scope of the following claims.

I claim:

1. A security alarm and paging system comprising:

a residence structure having first access areas subject to unauthorized intrusion;

first electronic means for transmitting a first electronic signal via free space upon occurrence of an unauthorized intrusion of the residence structure, said first electronic means including a plurality of first sensors, each of said first sensors being selectively positioned proximate each of said first access areas within the residence structure;

a motor vehicle having second access areas subject to unauthorized intrusion;

second electronic means for transmitting a second electronic signal via free space upon occurrence of an unauthorized intrusion of the motor vehicle, said second electronic means including a plurality of second sensors, each of said second sensors being selectively positioned proximate each of said second access areas within the motor vehicle; and a personal pager device having third electronic means for receiving said first electronic signal and said second electronic signal, said pager device including a readout screen in electronic communication with a controller that displays a specific one of said first and second access areas of the residence structure or the motor vehicle in which an unauthorized intrusion has occurred, said pager device further including a timer in electronic communication with said controller for emitting a signal at the end of a predetermined period.

2. The security alarm and paging system according to claim 1, wherein said first electronic means includes a first microprocessor and said second electronic means includes a second microprocessor.

3. The security alarm and paging system according to claim 1, wherein said pager device includes a fourth electronic means for converting said first electronic signal and said second electronic to an alarm.

4. The security alarm and paging system according to claim 3, wherein said alarm is selected from the group consisting of a tactile alarm, a visual alarm and an audible alarm.

5. The security alarm and paging system according to claim 1, wherein said pager device includes means for disarming said first electronic means and said second electronic means.

* * * * *